United States Patent
Liu

(10) Patent No.: US 9,138,898 B2
(45) Date of Patent: Sep. 22, 2015

(54) REMOVAL MECHANISM FOR PRINTED CIRCUIT BOARD

(75) Inventor: Da-Wei Liu, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 1132 days.

(21) Appl. No.: 12/852,591

(22) Filed: Aug. 9, 2010

(65) Prior Publication Data
US 2011/0113622 A1  May 19, 2011

(30) Foreign Application Priority Data
Nov. 16, 2009  (CN) .......................... 2009 1 0309800

(51) Int. Cl.
*B25J 15/06* (2006.01)

(52) U.S. Cl.
CPC ........ *B25J 15/0616* (2013.01); *Y10T 29/53191* (2015.01); *Y10T 29/53274* (2015.01)

(58) Field of Classification Search
CPC .............. B25J 15/0616; B25J 15/0683; Y10T 29/53191
USPC ........................... 29/743; 294/183–65; 901/40
See application file for complete search history.

(56) References Cited

U.S. PATENT DOCUMENTS 4,960,298 A * 10/1990 Moroi .......................... 414/627
6,927,974 B2 * 8/2005 Robillard et al. .......... 361/679.4

FOREIGN PATENT DOCUMENTS

| CN | 1974355 A | | 6/2007 |
| CN | 1974355 A | * | 6/2007 |
| DE | 10316125 B3 | * | 8/2004 |
| JP | 2002160187 A | | 6/2002 |

OTHER PUBLICATIONS

Machine translation of DE10316125B3, obtained Mar. 16, 2014.*
Machine translation of CN1974355A, obtained Match 16, 2014.*

* cited by examiner

*Primary Examiner* — Livius R Cazan
(74) *Attorney, Agent, or Firm* — Novak Druce Connolly Bove + Quigg LLP

(57) ABSTRACT

Removal mechanism for holding a PCB includes a suction cup, a floating pin comprising a rod and a frustum-shaped head at an end, a connecting member and a positioning board for supporting the PCB opposite to a positioning surface of the suction cup, the positioning board forming a positioning post corresponding to a pinhole of the suction cup. The positioning surface of the suction cup is for holding the PCB, and defines a pinhole having a frustum-shaped opening at the positioning surface. The connecting member defines a limiting hole for receiving the head of the floating pin. The opening has an angled sliding surface, and the end of the floating pin away from the head is connected to the suction cup, and an axial and radial movement of the floating pin adjusts relative position of the suction cup and the positioning post for aligning the positioning post and the pinhole.

12 Claims, 4 Drawing Sheets

REMOVAL MECHANISM FOR PRINTED CIRCUIT BOARD

BACKGROUND

1. Technical Field

The present disclosure relates to device mounting and, particularly, to a removal mechanism for a printed circuit board.

2. Description of the Related Art

A commonly used removal mechanism for a printed circuit board (PCB) generally includes a suction cup forming a positioning post facing the PCB. The PCB defines a positioning hole through which the positioning post passes, for positioning the PCB, such that the removal mechanism can hold the PCB properly. However, possible positioning errors of the removal mechanism may allow the positioning post to abut an edge of the positioning hole, and damage or break the PCB.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views, and both the views are schematic.

DETAILED DESCRIPTION

Figure 1:
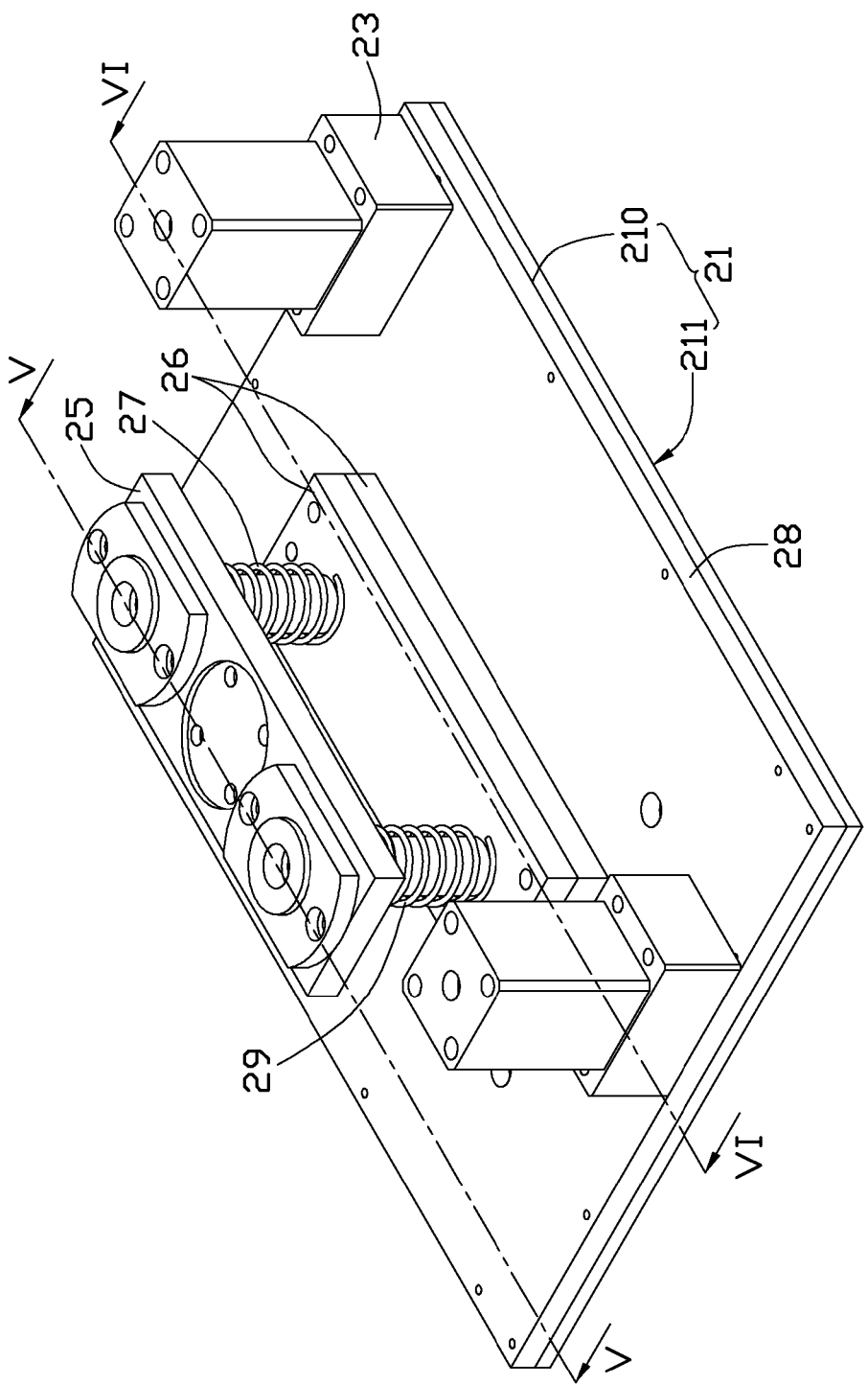
FIG. 1 is an isometric view of an embodiment of a removal mechanism.
Figure 2:
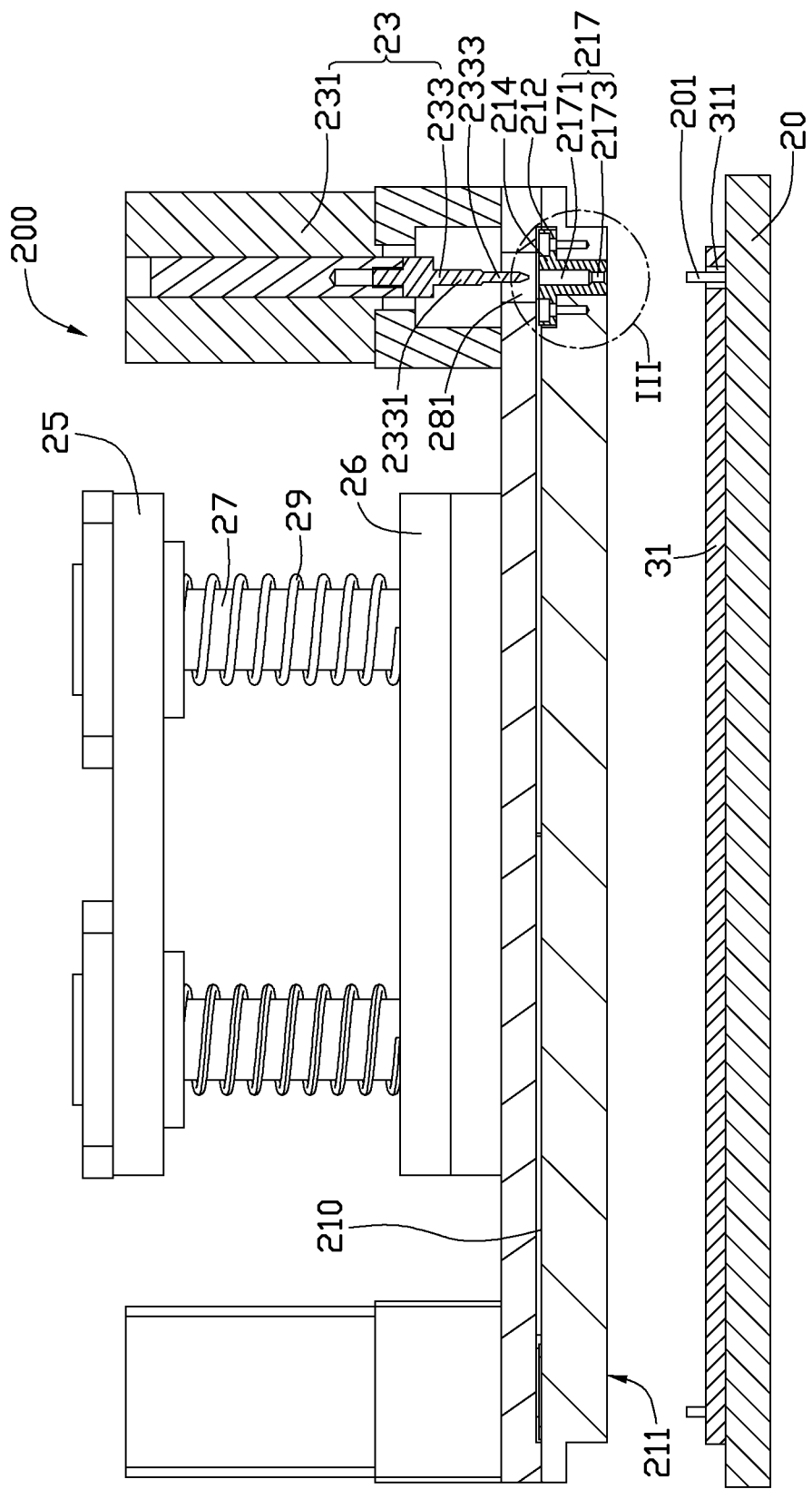
FIG. 2 is a cross section of the removal mechanism shown in FIG. 1, taken along the line II-II.

Referring to FIGS. 1 and 2, an exemplary embodiment of a removal mechanism 200 includes a positioning board 20, a suction cup 21 opposite to the positioning board 20, two positioning assemblies 23, a connecting member 25, two connecting boards 26, two floating pins 27, a fixing board 28 and two elastic members 29. The fixing board 28 is fixed on the suction cup 21. The connecting boards 26 and the positioning assemblies 23 are fixed on the fixing board 28. An end of each floating pin 27 is fixed in the connecting board 26, and the other end of each floating pin 27 is connected to the connecting member 25. Each elastic member 29 is sleeved on one floating pin 27 accordingly.

The fixing board 20 is substantially rectangular. Two positioning posts 201 are formed on a surface of the fixing board 20. The two positioning posts 201 are spaced from each other, and are extended from the surface of the fixing board 20.

Figure 3:
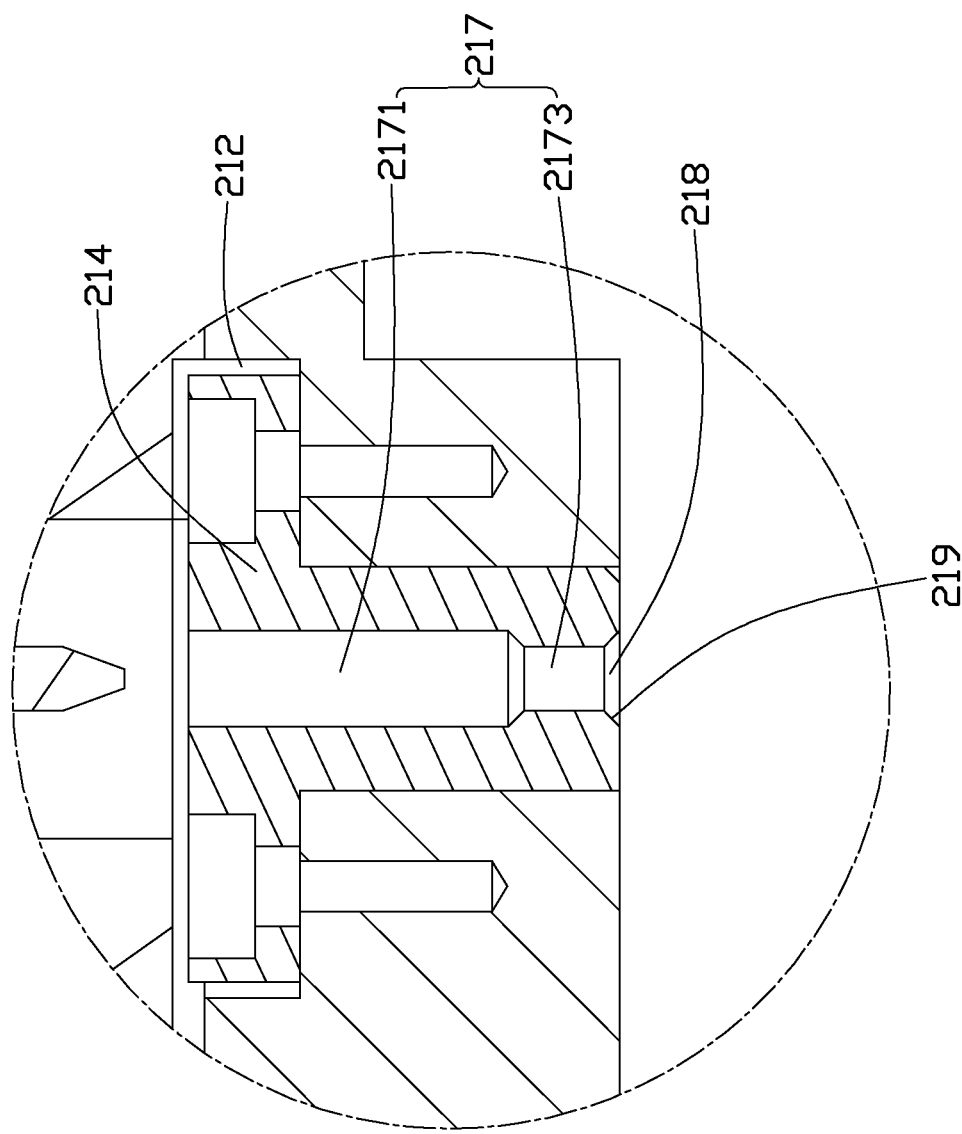
FIG. 3 is an enlarged view of a zone III shown in FIG. 2.
Figure 4:
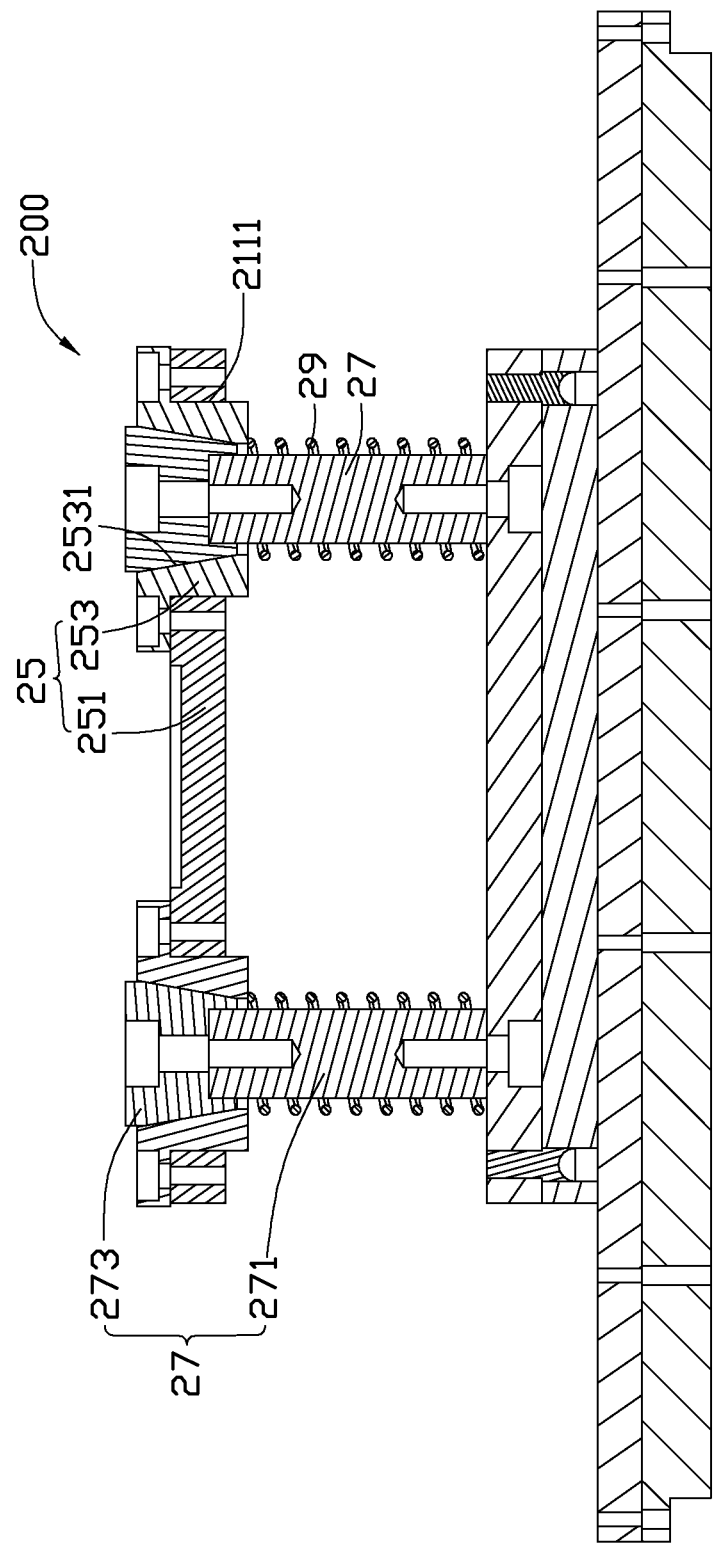
FIG. 4 is a cross section of the removal mechanism shown in FIG. 1, taken along the line IV-IV.

Referring also to FIGS. 3 and 4, the suction cup 21 has a shape corresponding to that of the fixing board 20. The suction cup 21 includes a fixing surface 210 and a positioning surface 211 opposite to the fixing surface 210. The suction cup 21 defines a T-shaped receiving hole 212 and further includes a pin bushing 214 fixed in the receiving hole 212. The pin bushing 214 defines a pinhole 217 therein. The pinhole 217 includes a first receiving portion 2171 adjacent to the fixing surface 210 and a second receiving portion 2173 communicating with the first receiving portion 2171. A diameter of the first receiving portion 2171 exceeds the diameter of the second receiving portion 2173. The pinhole 217 has a conical frustum-shaped opening 218 defined on the positioning surface 211. A diameter of the opening 218 increases towards the positioning surface 211. The opening 218 has an angled sliding surface 219 at a side surface thereof.

The positioning assembly 23 includes a cylinder 231 and a fixing pin 233 positioned on the cylinder 231. The fixing pin 233 is capable of extending out of the cylinder 231 or withdrawing thereinto. The fixing pin 233 includes a first rod portion 2331 adjacent to the cylinder 231 corresponding to the first receiving portion 2171 of the receiving hole 212 and a second rod portion 2333 away from the cylinder 231 corresponding to the second receiving portion 2173 of the receiving hole 212.

The connecting member 25 includes a main body 251 and two sleeves 253. The main body 251 defines two fixing holes 2111 corresponding to the two sleeves 253. Each sleeve 253 is fixed in one of the fixing holes 2111. Each sleeve 253 defines a frustum-shaped limiting hole 2531.

The floating pin 27 includes a rod 271 and a head 273 at an end of the rod 271. The head 273 is frustum-shaped, corresponding to the limiting hole 2531 of the connecting member 25. A diameter of the head 273 is decreased gradually toward the rod 271. A maximum diameter of the head 273 exceeds the maximum diameter of the limiting hole 2531. The fixing board 28 defines two through holes 281 corresponding to the two receiving holes 212, respectively. In the illustrated embodiment, the elastic member 29 is a helical spring.

In assembly, the fixing board 28 is fixed on the fixing surface 210 of the suction cup 21, and the through hole 281 communicates with one pinhole 217. The two connecting boards 26 are stacked and fixed on a surface of the fixing board 28 away from the suction cup 21. The rod 271 of each floating pin 27 is extended through the limiting hole 2531 of the connecting member 25 and the elastic member 29 in that order, and is finally fixed on the connecting board 26. An end of the elastic member 29 resists the connecting board 26, the other end of the elastic member 29 resists the connecting member 25, thus the connecting member 25 is capable of sliding along an axis of the rod 271 by compressing the elastic member 29 and not detaching from the floating pin 27. The positioning assemblies 23 are mounted on the fixing surface 210 where the receiving holes 212 are defined, thus the fixing pin 233 of each positioning assembly 23 is capable of passing through the through hole 281 and the pin bushing 214 in that order, and extending out of the suction cup 21.

The connecting member 25 of the removal mechanism 200 may be connected to an arm of a robot (not shown), such that the robot is capable of holding a PCB 31 on the positioning board 20. The PCB 31 defines a positioning hole 311 at a corner; the positioning board 20 defines the positioning post 201 corresponding to the positioning hole 311. The positioning posts 201 pass through the positioning holes 311 accordingly, so as to prevent movement of the PCB 31 on the positioning board 20. In the illustrated embodiment, the PCB 31 is a flexible printed circuit board.

In use, the robot moves the suction cup 21 close to the PCB 31, and each positioning post 201 is received in the opening 218 of the suction cup 21. If the positioning post 201 is not aligned with the pinhole 217 due to error, the positioning post 201 contacts the sliding surface 219, and the connecting board 26 compresses the elastic member 29 and moves along the axis of the rod 271 relative to the connecting member 25. The head 273 slides into the limiting hole 2531, such that the head 273 is capable of radial movement in the limiting hole 2531. A radial movement of the head 273 relative to the positioning post 201 occurs to adjust the relative position of the positioning post 201 and the suction cup 21 for aligning the positioning post 201 and the pinhole 217. The positioning post 201 slides along the sliding surface 219 and is finally received into the pinhole 217. The suction cup 21 holds the PCB 31, and the robot raises the suction cup 21 to remove the PCB 31 from the positioning board 20. The cylinder 231 drives the fixing pin 233 out when the suction cup 21 is raised, thus the fixing pin 233 passes through the pinhole 217 and the positioning hole 311 of the PCB 31 in order, to prevent movement of the PCB 31 on the suction cup 21. Then, the robot transports the PCB 31 for manufacture.

The removal mechanism 200 defines the frustum-shaped opening 218 at the positioning surface 211 of the suction cup 21, and the opening 218 having an angled sliding surface 219. In addition, the removal mechanism 200 further includes the floating pin 27. When the positioning post 201 is not aligned with the pinhole 217 due to positioning errors, the floating pin 27 is able to move axially and radially to adjust the relative position of the suction cup 21 and the positioning post 201 to align the positioning post 201 and the pinhole 217, thereby protecting the PCB 31 from being damaged or breakage when held by the suction cup 21.

It is understood that the connecting board 26 may be omitted, wherein the floating pin 27 is fixed on the fixing board 28, and the fixing board 28 may be omitted, wherein the floating pin 27 is directly fixed on the suction cup 21.

Finally, while particular embodiments have been described, the description is illustrative and is not to be construed as limiting. For example, various modifications can be made to the embodiments by those of ordinary skill in the art without departing from the true spirit and scope of the invention as defined by the appended claims.

What is claimed is:

1. A removal mechanism for a PCB, comprising:
   a suction cup comprising a positioning surface for holding the PCB, the suction cup defining a receiving hole;
   a floating pin comprising a rod and a frustum-shaped head at an end of the rod,
   a connecting member defining a limiting hole for receiving the head of the floating pin,
   a pin bushing received in the receiving hole, the pin bushing defining a pinhole comprising a frustum-shaped opening at the positioning surface,
   a positioning board for supporting the PCB opposite to the positioning surface of the suction cup, the positioning board forming a positioning post corresponding to the pinhole, and
   wherein the opening has an angled sliding surface, an end of the floating pin away from the head is directly or indirectly connected to the suction cup, and a relative position of the suction cup and the positioning post is adjustable by an axial movement and a radial movement of the floating pin such that the positioning post and the pinhole are aligned.

2. The removal mechanism of claim 1, wherein a maximum diameter of the head exceeds the maximum diameter of the limiting hole.

3. The removal mechanism of claim 1, further comprising a fixing board fixed on a surface of the suction cup opposite to the positioning surface, wherein the rod is fixed on a connecting board.

4. The removal mechanism of claim 3, further comprising an elastic member sleeved on the rod, wherein the elastic member has an end thereof resisting the connecting member, and the other end of the elastic member resists the connecting board.

5. The removal mechanism of claim 4, further comprising a positioning assembly mounted on the fixing board, wherein the fixing board defines a through hole corresponding to the pinhole, the positioning assembly comprises a cylinder and a fixing pin positioned on the cylinder, and the fixing pin is capable of passing through the through hole and the pinhole and extending out of the suction cup.

6. The removal mechanism of claim 5, wherein the pinhole comprises a first receiving portion and a second receiving portion communicating with the first receiving portion, the fixing pin comprises a first rod portion corresponding to the first receiving portion and a second rod portion corresponding to the second receiving portion.

7. A removal mechanism for holding a PCB, comprising:
   a suction cup comprising a positioning surface for holding the PCB, the suction cup defining a pinhole comprising a frustum-shaped opening at the positioning surface,
   a floating pin comprising a rod and a frustum-shaped head at an end,
   a connecting member defining a limiting hole for receiving the head of the floating pin,
   a positioning assembly mounted on the suction cup, and
   a positioning board for supporting the PCB opposite to the positioning surface of the suction cup, the positioning board forming a positioning post corresponding to the pinhole,
   wherein the positioning assembly comprises a cylinder and a fixing pin positioned on the cylinder, the fixing pin is capable of passing through a through hole and the pinhole and extending out of the suction cup, the opening has an angled sliding surface, the other end of the floating pin, away from the head is directly or indirectly connected to the suction cup, and a relative position of the suction cup and the positioning post is adjustable by an axial movement and a radial movement of the floating pin such that the positioning post and the pinhole are aligned.

8. The removal mechanism of claim 7, wherein a maximum diameter of the head exceeds the maximum diameter of the limiting hole.

9. The removal mechanism of claim 7, further comprising a fixing board fixed on a surface of the suction cup opposite to the positioning surface, wherein the rod is fixed on a connecting board.

10. The removal mechanism of claim 7, further comprising an elastic member sleeved on the rod, wherein an end of the elastic member resists the connecting member, and the other end of the elastic member resists the connecting board.

11. The removal mechanism of claim 10, further comprising a pin bushing, wherein the pin bushing is received in a receiving hole defined in the suction cup, and in which the pinhole is defined.

12. The removal mechanism of claim 10, wherein the pinhole comprises a first receiving portion and a second receiving portion communicating with the first receiving portion, and the fixing pin comprises a first rod portion corresponding to the first receiving portion and a second rod portion corresponding to the second receiving portion.

* * * * *